United States Patent
Hamauzu

(10) Patent No.: US 12,456,220 B2
(45) Date of Patent: Oct. 28, 2025

(54) RADIOGRAPHIC IMAGE PROCESSING DEVICE, RADIOGRAPHIC IMAGE PROCESSING METHOD, AND RADIOGRAPHIC IMAGE PROCESSING PROGRAM

(71) Applicant: FUJIFILM Corporation, Tokyo (JP)

(72) Inventor: Shin Hamauzu, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 458 days.

(21) Appl. No.: 17/819,235

(22) Filed: Aug. 11, 2022

(65) Prior Publication Data
US 2023/0066446 A1     Mar. 2, 2023

(30) Foreign Application Priority Data
Aug. 31, 2021   (JP) .................................. 2021-141803

(51) Int. Cl.
G06T 7/70     (2017.01)
G06T 7/00     (2017.01)

(52) U.S. Cl.
CPC .............. *G06T 7/70* (2017.01); *G06T 7/0014* (2013.01); *G06T 2207/10116* (2013.01); *G06T 2207/30004* (2013.01)

(58) Field of Classification Search
None
See application file for complete search history.

(56) References Cited

U.S. PATENT DOCUMENTS

| 2018/0250076 | A1* | 9/2018 | Gemmel .................. A61B 6/12 |
| 2018/0272089 | A1* | 9/2018 | Maracaja ............... A61B 1/126 |
| 2021/0121155 | A1* | 4/2021 | Maguire .................. A61B 6/12 |
| 2022/0164996 | A1* | 5/2022 | Baenen ................... G06T 11/00 |

FOREIGN PATENT DOCUMENTS

| JP | 2013085880 A | * | 5/2013 |
| JP | 2018134197 A | * | 8/2018 |

OTHER PUBLICATIONS

Smith, Gary M., James C. Reed, and Robert H. Choplin. "Radiographic detection of esophageal malpositioning of endotracheal tubes." AJR. American journal of roentgenology 154.1 (1990): 23-26. (Year: 1990).*

* cited by examiner

*Primary Examiner* — Vincent Rudolph
*Assistant Examiner* — Meredith Taylor
(74) *Attorney, Agent, or Firm* — Studebaker Brackett PLLC

(57) ABSTRACT

A processor acquires a first radiographic image and a second radiographic image obtained by irradiating a subject, into which a tracheal tube has been inserted, with radiation in different directions, derives a three-dimensional position of a distal end of the tracheal tube in the subject on the basis of a position of the distal end of the tracheal tube in each of the first radiographic image and the second radiographic image, derives a three-dimensional position of a bronchial bifurcation in the subject on the basis of a bronchial bifurcation position in each of the first radiographic image and the second radiographic image, and determines insertion of the tracheal tube into an esophagus on the basis of the three-dimensional position of the distal end of the tracheal tube and the three-dimensional position of the bronchial bifurcation.

4 Claims, 7 Drawing Sheets

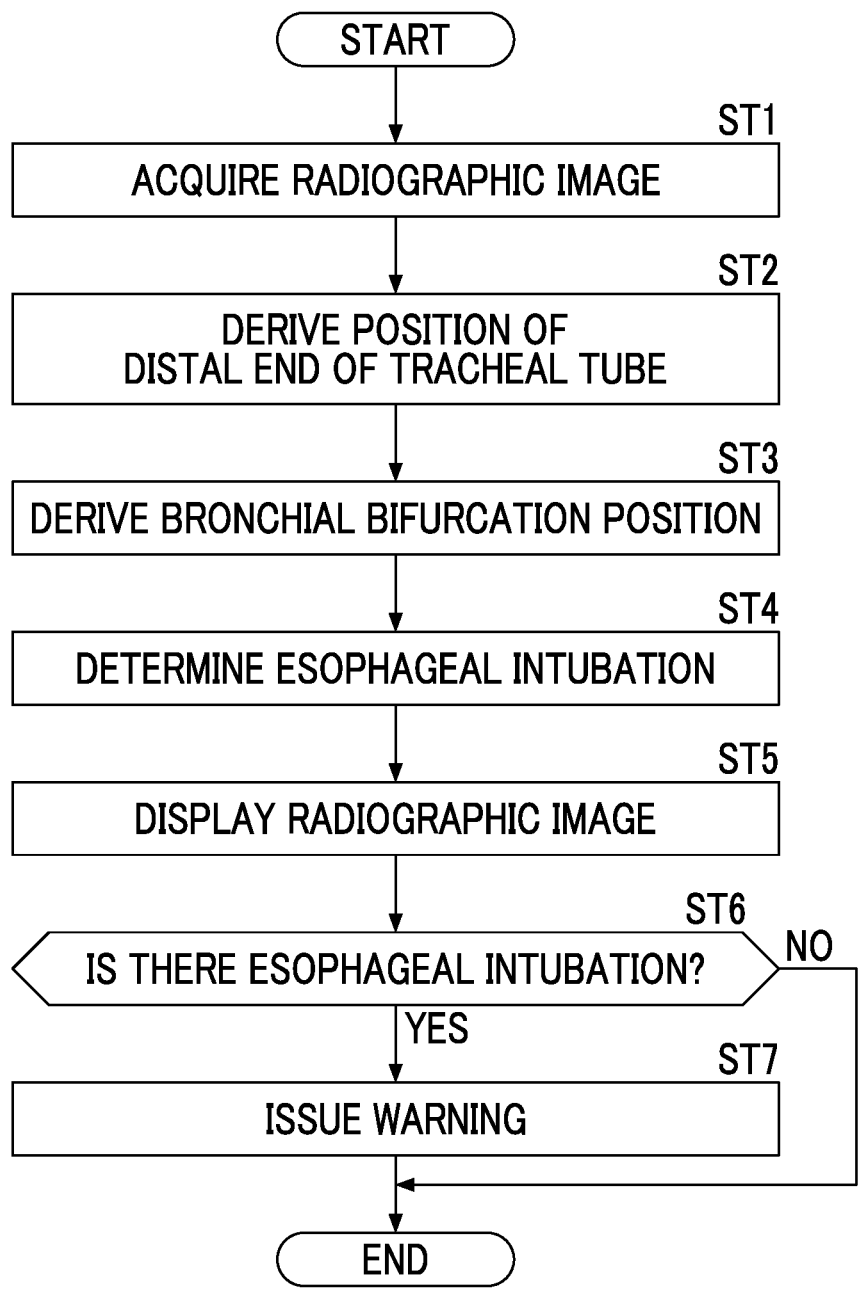

RADIOGRAPHIC IMAGE PROCESSING DEVICE, RADIOGRAPHIC IMAGE PROCESSING METHOD, AND RADIOGRAPHIC IMAGE PROCESSING PROGRAM

CROSS REFERENCE TO RELATED APPLICATIONS

The present application claims priority under 35 U.S.C. § 119 to Japanese Patent Application No. 2021-141803 filed on Aug. 31, 2021. The above application is hereby expressly incorporated by reference, in its entirety, into the present application.

BACKGROUND

Technical Field

The present disclosure relates to a radiographic image processing device, a radiographic image processing method, and a radiographic image processing program.

Related Art

Tracheal intubation is a procedure method that inserts a tracheal tube through the larynx from the mouth or the nose to secure an airway. In a case in which a distal end of the tracheal tube goes deeper than a bronchial bifurcation position during the tracheal intubation, one-lung intubation occurs. In addition, in a case in which the distal end of the tracheal tube is located too far in front of the bronchial bifurcation position, it causes laryngeal damage and poor ventilation. Therefore, during the tracheal intubation, an X-ray image of the front of the chest is captured, and it is checked that the tracheal tube is placed at an appropriate position using the X-ray image. Here, the tracheal tube includes an X-ray opaque line in a longitudinal direction. Therefore, since the X-ray opaque line appears as a high-brightness line in the X-ray image, it is possible to easily check the position of the distal end of the tracheal tube.

In addition, image processing that highlights the tracheal tube and the bronchial bifurcation position is performed on the X-ray image in order to easily check the position of the distal end of the tracheal tube and the bronchial bifurcation position in the X-ray image. Further, JP2018-134197A proposes a method that specifies the position of a distal end of a device inserted into a body using two X-ray images obtained by irradiating a subject with X-rays in different directions.

On the other hand, during the tracheal intubation, it is necessary to prevent the tracheal tube from being inserted into an esophagus. However, the trachea and the esophagus are located on the thoracic and dorsal sides of the human body, respectively. Therefore, since it is not possible to understand an anteroposterior relationship between the trachea and the esophagus only from the X-ray image of the front of the chest, it is not possible to check the insertion of the tracheal tube into the esophagus. Further, in the X-ray image of the front of the chest, the trachea and the esophagus overlap the vertebrae. Therefore, it is difficult to check the trachea bifurcation position. Furthermore, the method disclosed in JP2018-134197A can specify the position of the distal end of the tracheal tube using two X-ray images. However, it is not possible to check the insertion of the tracheal tube into the esophagus. Moreover, in a case in which the X-ray image is highlighted, it is easy to check the position of the tracheal tube and the tracheal bifurcation position. However, in a case in which the X-ray image is highlighted, it is not possible to perform normal image interpretation for checking an abnormality in the chest.

SUMMARY OF THE INVENTION

The present disclosure has been made in view of the above circumstances, and an object of the present disclosure is to provide a technique that can check the insertion of a tracheal tube into the esophagus.

According to the present disclosure, there is provided a radiographic image processing device comprises at least one processor. The processor acquires a first radiographic image and a second radiographic image obtained by irradiating a subject, into which a tracheal tube has been inserted, with radiation in different directions, derives a three-dimensional position of a distal end of the tracheal tube in the subject on the basis of a position of the distal end of the tracheal tube in each of the first radiographic image and the second radiographic image, derives a three-dimensional position of a bronchial bifurcation in the subject on the basis of a bronchial bifurcation position in each of the first radiographic image and the second radiographic image, and determines insertion of the tracheal tube into an esophagus on the basis of the three-dimensional position of the distal end of the tracheal tube and the three-dimensional position of the bronchial bifurcation.

In addition, in the radiographic image processing device according to the present disclosure, the processor may determine that the tracheal tube is inserted into the esophagus in a case in which the three-dimensional position of the distal end of the tracheal tube is located on a dorsal side of the subject at a distance of a predetermined threshold value or more from the three-dimensional position of the bronchial bifurcation.

Further, in the radiographic image processing device according to the present disclosure, the processor may issue a warning in a case in which it is determined that the tracheal tube is inserted into the esophagus.

Furthermore, in the radiographic image processing device according to the present disclosure, the processor may display the first radiographic image or the second radiographic image and display the position of the distal end of the tracheal tube and the bronchial bifurcation position in the first radiographic image or the second radiographic image to be distinguished from other regions.

According to the present disclosure, there is provided a radiographic image processing method comprising: acquiring a first radiographic image and a second radiographic image obtained by irradiating a subject, into which a tracheal tube has been inserted, with radiation in different directions; deriving a three-dimensional position of a distal end of the tracheal tube in the subject on the basis of a position of the distal end of the tracheal tube in each of the first radiographic image and the second radiographic image; deriving a three-dimensional position of a bronchial bifurcation in the subject on the basis of a bronchial bifurcation position in each of the first radiographic image and the second radiographic image; and determining insertion of the tracheal tube into an esophagus on the basis of the three-dimensional position of the distal end of the tracheal tube and the three-dimensional position of the bronchial bifurcation.

In addition, a program that causes a computer to perform the radiographic image processing method may be provided.

According to the present disclosure, it is possible to check the insertion of the tracheal tube into the esophagus.

BRIEF DESCRIPTION OF THE DRAWINGS

FIG. 11 is a flowchart illustrating a process performed in this embodiment.

DETAILED DESCRIPTION

Figure 1:
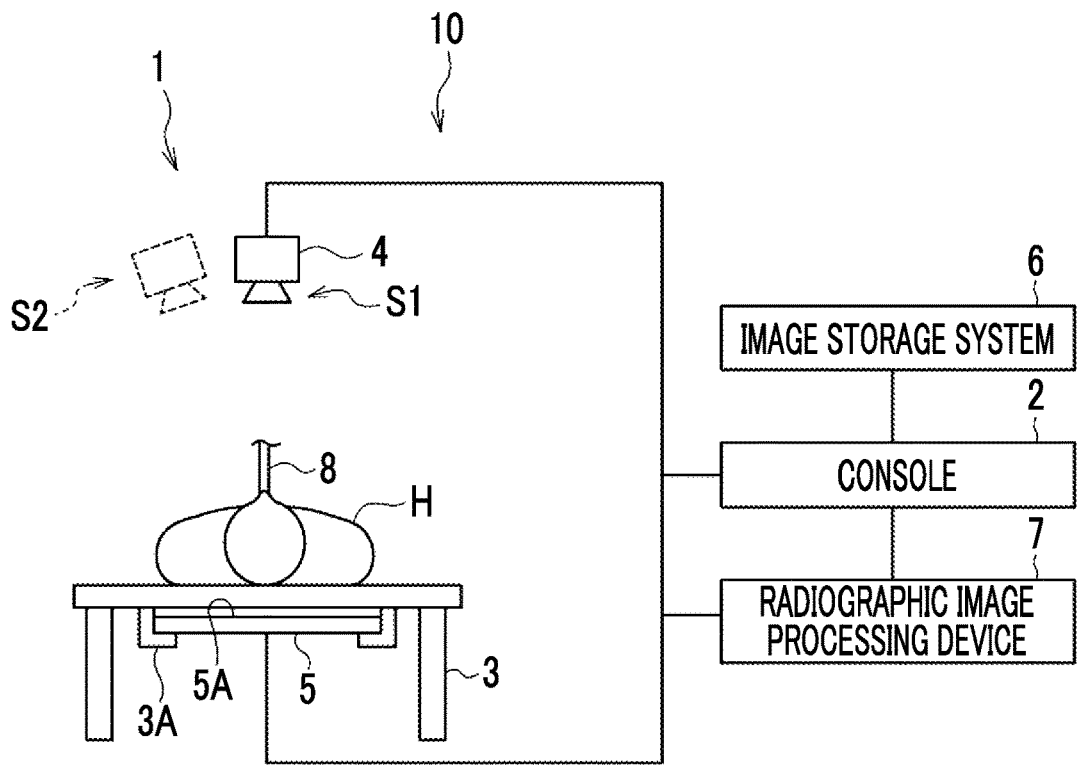
FIG. 1 is a block diagram schematically illustrating a configuration of a radiography system to which a radiographic image processing device according to an embodiment of the present disclosure is applied.

Hereinafter, an embodiment of the present disclosure will be described with reference to the drawings. FIG. 1 is a block diagram schematically illustrating a configuration of a radiography system to which a radiographic image processing device according to the embodiment of the present disclosure is applied. As illustrated in FIG. 1, a radiography system 10 according to this embodiment acquires a radiographic image of a subject who is a tracheal intubated patient and detects the insertion of a tracheal tube into the esophagus. The radiography system 10 according to this embodiment comprises an imaging apparatus 1, a console 2, an image storage system 6, and a radiographic image processing device 7.

The imaging apparatus 1 is an imaging apparatus that detects radiation, which has been emitted from a radiation source 4, such as an X-ray source, and transmitted through a subject H, with a radiation detector 5 to acquire a radiographic image of the subject H that lies supine on an imaging table 3. The radiographic image is input to the console 2. In addition, the radiation source 4 can be moved to a first radiation source position S1 and a second radiation source position S2 by a moving mechanism (not illustrated). In this way, a direction in which the subject H is irradiated with radiation can be changed in the imaging apparatus 1. In this embodiment, it is assumed that the subject H is irradiated with the radiation at different positions to acquire two radiographic images having different irradiation directions of the radiation.

Further, the radiation detector 5 is a portable radiation detector and is attached to the imaging table 3 by an attachment portion 3A that is provided in the imaging table 3. In addition, the radiation detector 5 may be fixed to the imaging table 3.

The console 2 has a function of controlling the imaging apparatus 1 using, for example, an imaging order and various kinds of information acquired from a radiology information system (RIS) (not illustrated) or the like through a network, such as a wireless communication local area network (LAN), and commands or the like directly issued by an engineer or the like. For example, in this embodiment, a server computer is used as the console 2.

The image storage system 6 is a system that stores image data of the radiographic images captured by the imaging apparatus 1. The image storage system 6 extracts an image corresponding to a request from, for example, the console 2 and the radiographic image processing device 7 from the stored radiographic images and transmits the image to a device that is the source of the request. A specific example of the image storage system 6 is a picture archiving and communication system (PACS).

Figure 2:
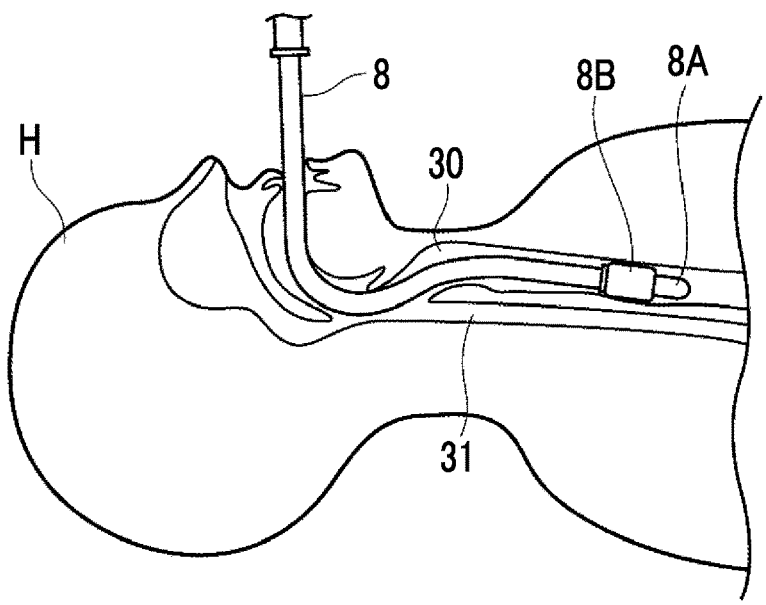
FIG. 2 is a diagram illustrating tracheal intubation.

Here, tracheal intubation will be described. FIG. 2 is a diagram illustrating the tracheal intubation. Tracheal intubation is a procedure method that inserts a tracheal tube through the larynx from the mouth or the nose to secure an airway. FIG. 2 illustrates a state in which a tracheal tube 8 is inserted from the mouth of the subject H. As illustrated in FIG. 2, in the body of the subject H, a trachea 30 is located on the thoracic side, an esophagus 31 is located on the dorsal side, and the trachea 30 and the esophagus 31 run in parallel. In a case in which the tracheal intubation is performed, the tracheal tube 8 is inserted such that it is not inserted into the esophagus 31 and a distal end 8A thereof is located several centimeters in front of the bronchus of the subject H. Then, at the inserted position, a cuff 8B that is attached in the vicinity of the distal end 8A of the tracheal tube 8 is inflated such that the tracheal tube 8 is fixed in the trachea. Then, air is sent to the subject H through the tracheal tube 8.

In addition, a material forming the tracheal tube 8 and the cuff 8B is, for example, polyvinyl chloride. Further, the tracheal tube 8 includes an X-ray opaque line. A material forming the X-ray opaque line is, for example, polyvinyl chloride containing barium sulfate. In addition, a plasticizer for polyvinyl chloride is, for example, di(2-ethylhexyl) phthalate.

Figure 3:
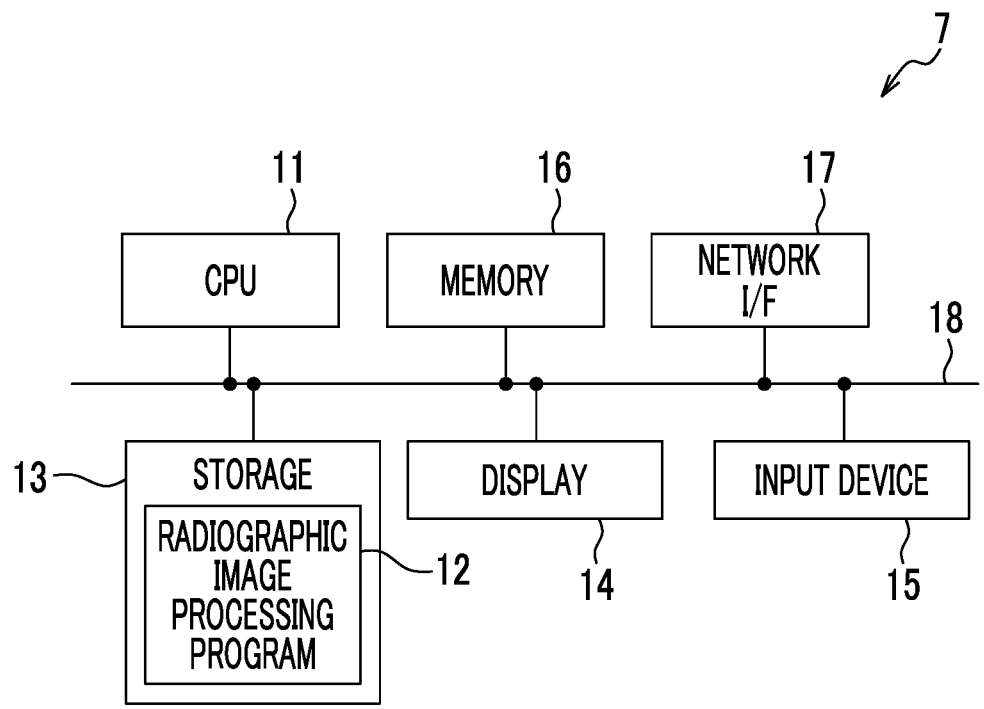
FIG. 3 is a diagram schematically illustrating a configuration of the radiographic image processing device according to this embodiment.

Next, the radiographic image processing device according to this embodiment will be described. First, the hardware configuration of the radiographic image processing device according to this embodiment will be described with reference to FIG. 3. As illustrated in FIG. 3, a radiographic image processing device 7 is a computer, such as a workstation, a server computer, or a personal computer, and comprises a central processing unit (CPU) 11, a non-volatile storage 13, and a memory 16 as a temporary storage area. In addition, the radiographic image processing device 7 comprises a display 14, such as a liquid crystal display, an input device 15, such as a keyboard and a mouse, and a network interface (I/F) 17 for connection to the console 2 and the like. The CPU 11, the storage 13, the display 14, the input device 15, the memory 16, and the network I/F 17 are connected to a bus 18. The CPU 11 is an example of a processor according to the present disclosure.

The storage 13 is implemented by, for example, a hard disk drive (HDD), a solid state drive (SSD), and a flash memory. A radiographic image processing program 12 installed in the radiographic image processing device 7 is stored in the storage 13 as a storage medium. The CPU 11 reads the radiographic image processing program 12 from the storage 13, expands the radiographic image processing program 12 in the memory 16, and executes the expanded radiographic image processing program 12.

In addition, the radiographic image processing program 12 is stored in a storage device of the server computer connected to the network or a network storage so as to be accessed from the outside and is downloaded and installed in the computer constituting the radiographic image processing device 7 on demand. Alternatively, the programs are recorded on a recording medium, such as a digital versatile disc (DVD) or a compact disc read only memory (CD-ROM), are distributed and installed in the computer constituting the radiographic image processing device 7 from the recording medium.

Figure 4:
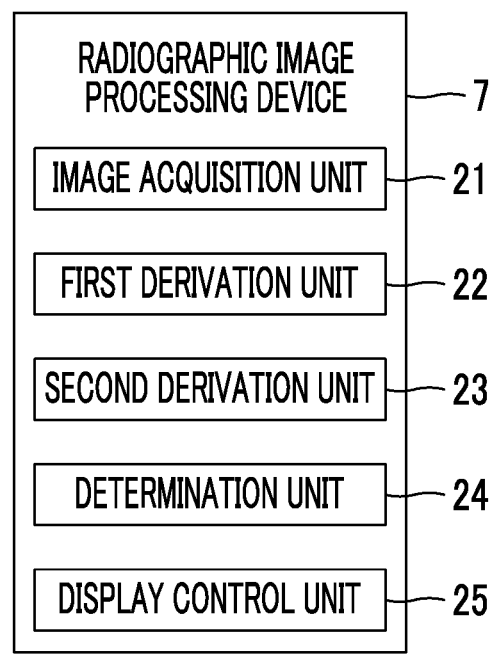
FIG. 4 is a diagram illustrating a functional configuration of the radiographic image processing device according to this embodiment.

Next, the functional configuration of the radiographic image processing device according to this embodiment will be described. FIG. 4 is a diagram illustrating the functional configuration of the radiographic image processing device according to a first embodiment. As illustrated in FIG. 4, the radiographic image processing device 7 comprises an image acquisition unit 21, a first derivation unit 22, a second derivation unit 23, a determination unit 24, and a display control unit 25. Then, the CPU 11 executes the radiographic image processing program 12 to function as the image acquisition unit 21, the first derivation unit 22, the second derivation unit 23, the determination unit 24, and the display control unit 25.

Figure 5:
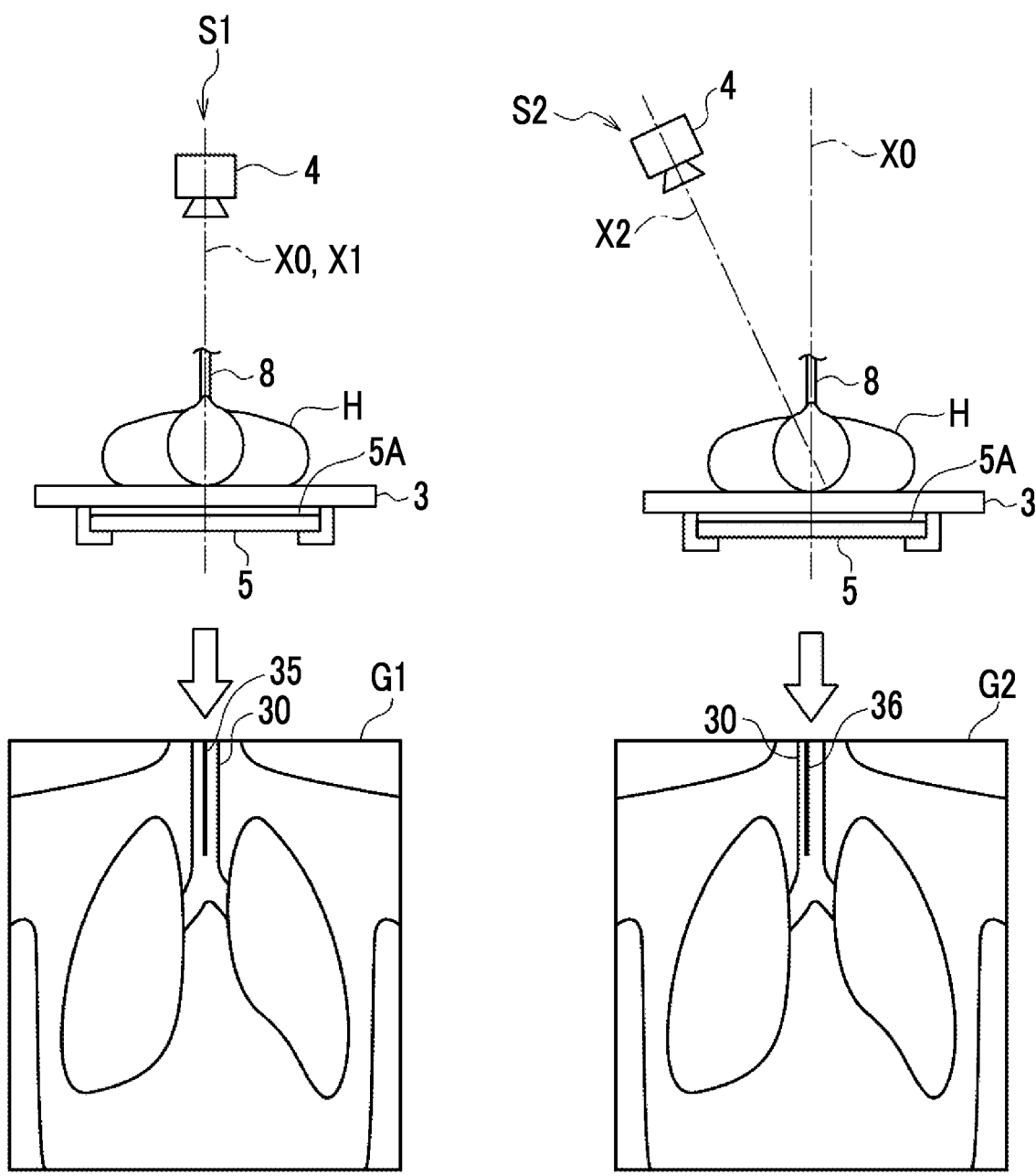
FIG. 5 is a diagram illustrating the acquisition of a radiographic image.

The image acquisition unit 21 acquires a radiographic image of the subject H. FIG. 5 is a diagram illustrating the acquisition of the radiographic image. The image acquisition unit 21 moves the radiation source 4 to the first radiation source position S1 first, drives the radiation source 4 to irradiate the subject H, into which the tracheal tube 8 has been inserted, with radiation, detects the radiation transmitted through the subject H with the radiation detector 5, and acquires a first radiographic image G1. The first radiation source position S1 is a position where an optical axis X1 of the radiation emitted from the radiation source 4 is aligned with an axis X0 orthogonal to the surface of the imaging table 3.

Further, the image acquisition unit 21 moves the radiation source 4 to the second radiation source position S2, drives the radiation source 4 to irradiate the subject H, into which the tracheal tube 8 has been inserted, with radiation, detects the radiation transmitted through the subject H with the radiation detector 5, and acquire a second radiographic image G2. The second radiation source position S2 is a position where an optical axis X2 of the radiation emitted from the radiation source 4 intersects the axis X0 orthogonal to the surface of the imaging table 3. An angle at which the optical axis X2 intersects the axis X0 can be, for example, 5 to 10 degrees, but is not limited thereto.

As illustrated in FIG. 5, the first radiographic image G1 and the second radiographic image G2 include the chest of the human body, and images 35 and 36 of the X-ray opaque lines included in the tracheal tube 8 in the trachea 30 are included in the first and second radiographic images G1 and G2, respectively. In this case, the image acquisition unit 21 sets imaging conditions, such as the type of target and filter used in the radiation source 4, an imaging dose, a tube voltage, and a source image receptor distance (SID). In this embodiment, the SID is a distance between the detection surface 5A of the radiation detector 5 and each of the first radiation source position S1 and the second radiation source position S2.

The first derivation unit 22 derives the three-dimensional position of the distal end 8A of the tracheal tube 8 in the subject H on the basis of the position of the distal end 8A of the tracheal tube 8 in each of the first radiographic image G1 and the second radiographic image G2. For this purpose, the first derivation unit 22 detects the distal ends of the images 35 and 36 from the first radiographic image G1 and the second radiographic image G2, respectively. In this embodiment, the distal ends of the images 35 and 36 are detected using a trained neural network subjected to machine learning so as to detect the distal ends of the images 35 and 36 in the radiographic images. However, the detection is not limited thereto. Any other method, such as template matching, can be used. The detected distal ends of the images 35 and 36 correspond to the distal end 8A of the tracheal tube 8.

Figure 6:
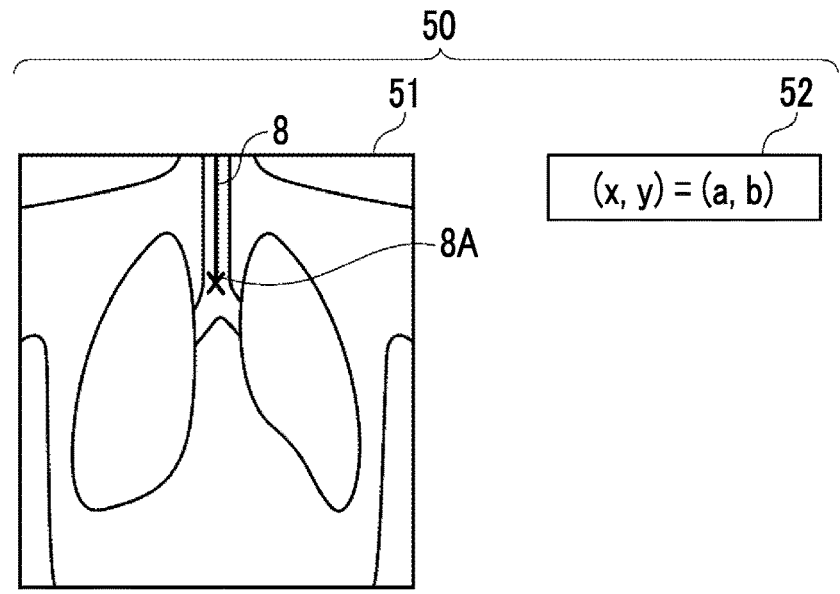
FIG. 6 is a diagram illustrating training data for constructing a trained neural network that detects a distal end of a tracheal tube.

The training of the neural network for constructing the trained neural network for detecting the distal end 8A of the tracheal tube 8 is performed using training data illustrated in FIG. 6. As illustrated in FIG. 6, training data 50 consists of a learning radiographic image 51 in which the tracheal tube 8 is inserted and correct answer data 52 indicating information of the coordinates of the distal end 8A of the tracheal tube 8 in the learning radiographic image 51. Then, a large amount of training data 50 is prepared, and the neural network is trained to construct the trained neural network that detects the distal end of the tracheal tube 8 from the radiographic image. In addition, the large amount of training data includes learning radiographic images obtained by imaging the subject at different angles. In a case in which it is difficult to prepare a large amount of training data, a radiographic image and an image of the tracheal tube, which has been created by computer graphics or obtained by photography, may be prepared, and the radiographic image and the image of the tracheal tube may be combined by combination parameters corresponding to the radiation absorption rate of the tracheal tube, the degree of radiation scattering, beam hardening in the radiographic image, noise corresponding to radiography conditions, and the like to prepare training data.

Figure 7:
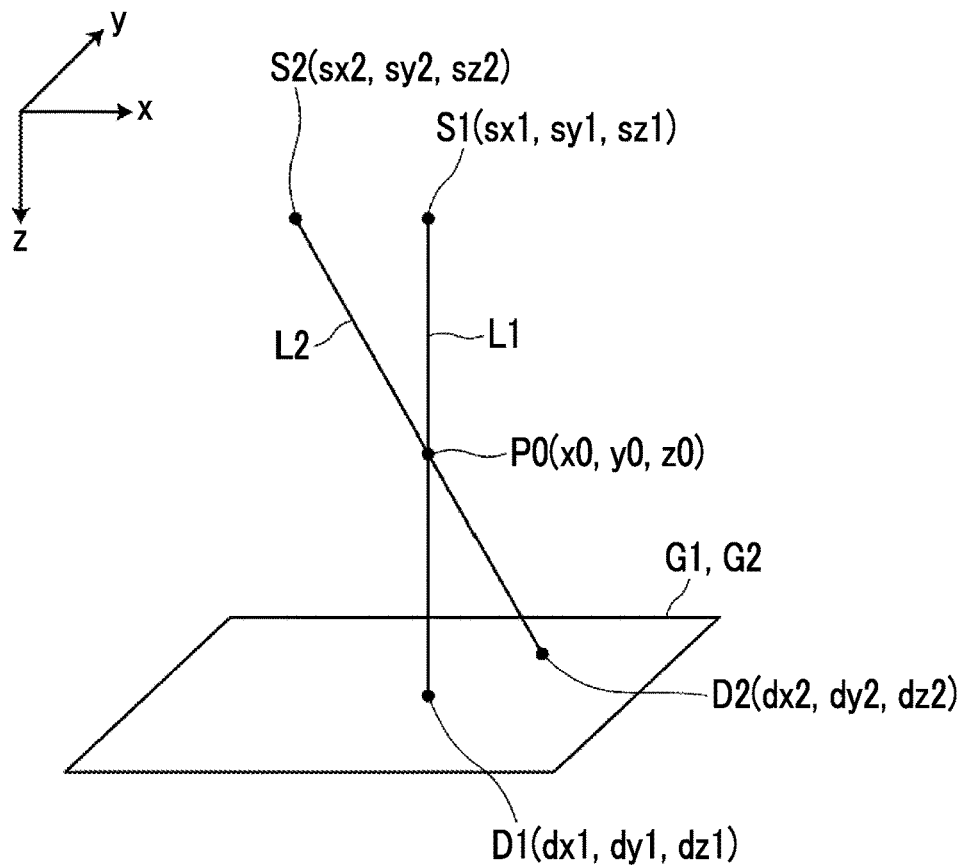
FIG. 7 is a diagram illustrating the derivation of a three-dimensional position of the distal end of the tracheal tube.

The first derivation unit 22 derives the three-dimensional position of the distal end 8A of the tracheal tube 8 in the subject H, using the positional relationship between the three-dimensional position of the distal end 8A of the tracheal tube 8 detected from the first and second radiographic images G1 and G2 on the detection surface 5A of the radiation detector 5 and the first and second radiation source positions S1 and S2 of the first radiation source 4. FIG. 7 is a diagram illustrating the derivation of the three-dimensional position of the distal end 8A of the tracheal tube 8. The first derivation unit 22 acquires the three-dimensional coordinates (sx1, sy1, sz1) of the first radiation source position S1, the three-dimensional coordinates (sx2, sy2, sz2) of the second radiation source position S2, the three-dimensional coordinates (dx1, dy1, dz1) of a position D1 of the distal end 8A of the tracheal tube 8 detected in the radiographic image G1 on the detection surface 5A, and the three-dimensional coordinates (dx2, dy2, dz2) of a position D2 of the distal end 8A of the tracheal tube 8 detected in the second radiographic image G2 on the detection surface 5A illustrated in FIG. 7.

The three-dimensional coordinates (sx1, sy1, sz1) of the first radiation source position S1 and the three-dimensional coordinates (sx2, sy2, sz2) of the second radiation source position S2 can be derived using the positional relationship between the origin and the first and second radiation source positions S1 and S2 in a case in which a coordinate system having, as the origin, any position in a space, in which the imaging apparatus 1 is installed, is set. For example, in this embodiment, it is possible to set a coordinate system having, as the origin, a point that bisects a line connecting the first radiation source position S1 and the second radiation source position S2.

On the other hand, since the SID is known, for example, it is possible to derive the three-dimensional coordinates of the center position of the detection surface 5A of the radiation detector 5 based on the origin from the first radiation source position S1. Then, it is possible to derive the three-dimensional coordinates of the positions D1 and D2 of the distal end 8A of the tracheal tube 8 on the detection surface 5A from the two-dimensional position coordinates of the detected distal end 8A of the tracheal tube 8 in the first and second radiographic images G1 and G2, using the three-dimensional coordinates of the center position of the detection surface 5A of the radiation detector 5.

The first derivation unit 22 sets a straight line L1 connecting the first radiation source position S1 and the position D1. Further, the first derivation unit 22 sets a straight line L2 connecting the second radiation source position S2 and the position D2. Any point P1 on the straight line L1 and any point P2 on the straight line L2 are represented by the following Expression (1) using the first and second radiation source positions S1 and S2 and the positions D1 and D2. In Expression (1), $\alpha 1$ and $\beta 1$ are parameters.

$$P1=(1-\alpha 1)\cdot S1+\alpha 1\cdot D1$$

$$P2=(1-\beta 1)\cdot S2+\beta 1\cdot D2 \qquad (1)$$

Ideally, the distal end 8A of the tracheal tube 8 is located at the intersection of the point P1 on the straight line L1 and the point P2 on the straight line L2 in the three-dimensional space. Therefore, in this embodiment, the first derivation unit 22 derives the three-dimensional coordinates of a point where the distance between the point P1 and the point P2 is the minimum as a three-dimensional position P0 (x0, y0, z0) of the distal end 8A of the tracheal tube 8, using the following Expression (2).

$$P0=\min(P1-P2)^2 \qquad (2)$$

Figure 8:
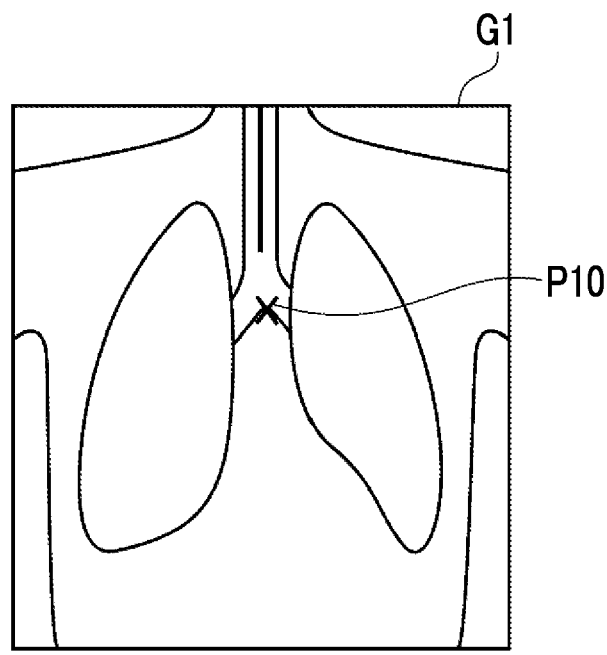
FIG. 8 is a diagram illustrating a bronchial bifurcation position.

The second derivation unit 23 derives the three-dimensional position of the bronchial bifurcation in the subject H on the basis of a bronchial bifurcation position in each of the first radiographic image G1 and the second radiographic image G2. For this purpose, the second derivation unit 23 detects the bronchial bifurcation position from each of the first radiographic image G1 and the second radiographic image G2. In this embodiment, it is assumed that the bronchial bifurcation position is the position of the internal carina of the trachea in a portion in which the trachea is divided into the left and right bronchi, as illustrated in FIG. 8. In addition, in FIG. 8, a bronchial bifurcation position P10 in the first radiographic image G1 is marked with a cross.

In this embodiment, the detection of the bronchial bifurcation position is performed using the trained neural network subjected to machine learning so as to detect the bronchial bifurcation position in the radiographic image. However, the detection is not limited thereto. Any other method, such as template matching, can be used.

Figure 9:
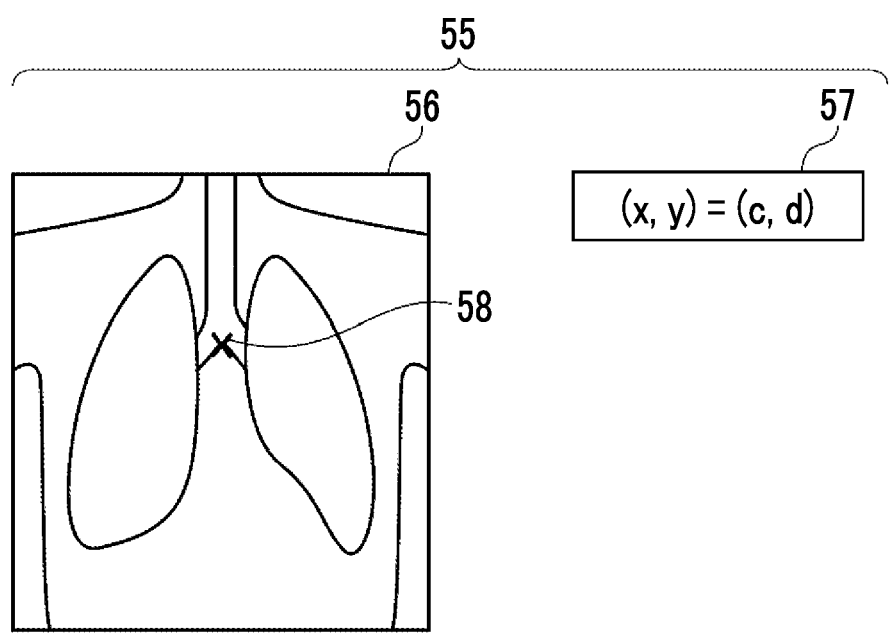
FIG. 9 is a diagram illustrating training data for constructing a trained neural network that detects the bronchial bifurcation position.

The training of the neural network for constructing the trained neural network for detecting the bronchial bifurcation position is performed using training data illustrated in FIG. 9. As illustrated in FIG. 9, training data 55 consists of a learning radiographic image 56 and correct answer data 57 indicating information of the coordinates of a bronchial bifurcation position 58 in the learning radiographic image 56. Then, a large amount of training data 55 is prepared, and the neural network is trained to construct the trained neural network that detects the bronchial bifurcation position from the radiographic image.

The second derivation unit 23 derives the three-dimensional position of the bronchial bifurcation in the subject H, using the positional relationship between the three-dimensional position of the bronchial bifurcation on the detection surface 5A detected from the first and second radiographic images G1 and G2 and the first and second radiation source positions S1 and S2. The derivation of the three-dimensional position of the bronchial bifurcation is performed in the same manner as the derivation of the three-dimensional position of the distal end 8A of the tracheal tube 8. That is, the second derivation unit 23 acquires the three-dimensional coordinates (sx1, sy1, sz1) of the first radiation source position S1, the three-dimensional coordinates (sx2, sy2, sz2) of the second radiation source position S2, the three-dimensional coordinates (dx3, dy3, dz3) of a bronchial bifurcation position D3 on the detection surface 5A detected in the first radiographic image G1, and the three-dimensional coordinates (dx4, dy4, dz4) of a bronchial bifurcation position D4 on the detection surface 5A detected in the second radiographic image G2.

Then, the second derivation unit 23 sets a straight line L3 connecting the first radiation source position S1 and the bronchial bifurcation position D3. Further, the second derivation unit 23 sets a straight line L4 connecting the second radiation source position S2 and a bronchial bifurcation position D4. Any point P3 on the straight line L3 and any point P4 on the straight line L4 are represented by the following Expression (3) using the first radiation source position S1, the second radiation source position S2, and the bronchial bifurcation positions D3 and D4. In Expression (3), $\alpha 2$ and $\beta 2$ are parameters.

$$P3=(1-\alpha 2)\cdot S1+\alpha 2\cdot D3$$

$$P4=(1-\beta 2)\cdot S2+\beta 2\cdot D4 \qquad (3)$$

Ideally, the bronchial bifurcation is located at the intersection of the point P3 on the straight line L3 and the point P4 on the straight line L4 in the three-dimensional space. Therefore, in this embodiment, the second derivation unit 23 derives the three-dimensional coordinates of a point where the distance between the point P3 and the point P4 is the minimum as a three-dimensional position P5(x5, y5, z5) of the bronchial bifurcation, using the following Expression (4).

$$P5=\min(P3-P4)^2 \qquad (4)$$

The determination unit 24 determines the insertion of the tracheal tube 8 into the esophagus, that is, esophageal intubation on the basis of the three-dimensional position P0 of the distal end 8A of the tracheal tube 8 and the three-dimensional position P5 of the bronchial bifurcation. Here, in the body of the subject H, the trachea 30 is located on the thoracic side, the esophagus 31 is located on the dorsal side, and the trachea 30 and the esophagus 31 run in parallel. Therefore, in a case in which the distal end 8A of the tracheal tube 8 is inserted into the trachea 30, the position of the distal end 8A of the tracheal tube 8 in the z direction and the position of the bronchial bifurcation position in the z direction are substantially matched with each other. On the other hand, in a case in which the position of the distal end 8A of the tracheal tube 8 in the z direction is on the dorsal side from the bronchial bifurcation position in the z direction and the difference between the positions is large, the distal end 8A of the tracheal tube 8 can be considered to be inserted into the esophagus 31.

Therefore, the determination unit 24 derives a difference Δz (=z0−z5) between a position z0 of the distal end 8A of the tracheal tube 8 in the z direction and a position z5 of the bronchial bifurcation in the z direction. Then, in a case in which Δz is equal to or greater than a predetermined threshold value Th1, it is determined that the tracheal tube 8 is inserted into the esophagus. The threshold value Th1 may be set to, for example, 1.5 cm to 2.0 cm in consideration of the diameter of the trachea 30 and the diameter of the esophagus 31 of a general human body. Further, the threshold value Th1 may be set according to the physique of the subject H.

The display control unit 25 displays the first radiographic image G1 or the second radiographic image G2 on the display 14. Then, in the displayed first radiographic image G1 or second radiographic image G2, the distal end 8A of the tracheal tube 8 and the bronchial bifurcation position are displayed so as to be distinguished from other regions. Furthermore, in a case in which the determination unit 24 determines that the esophageal intubation has occurred, a warning is issued.

Figure 10:
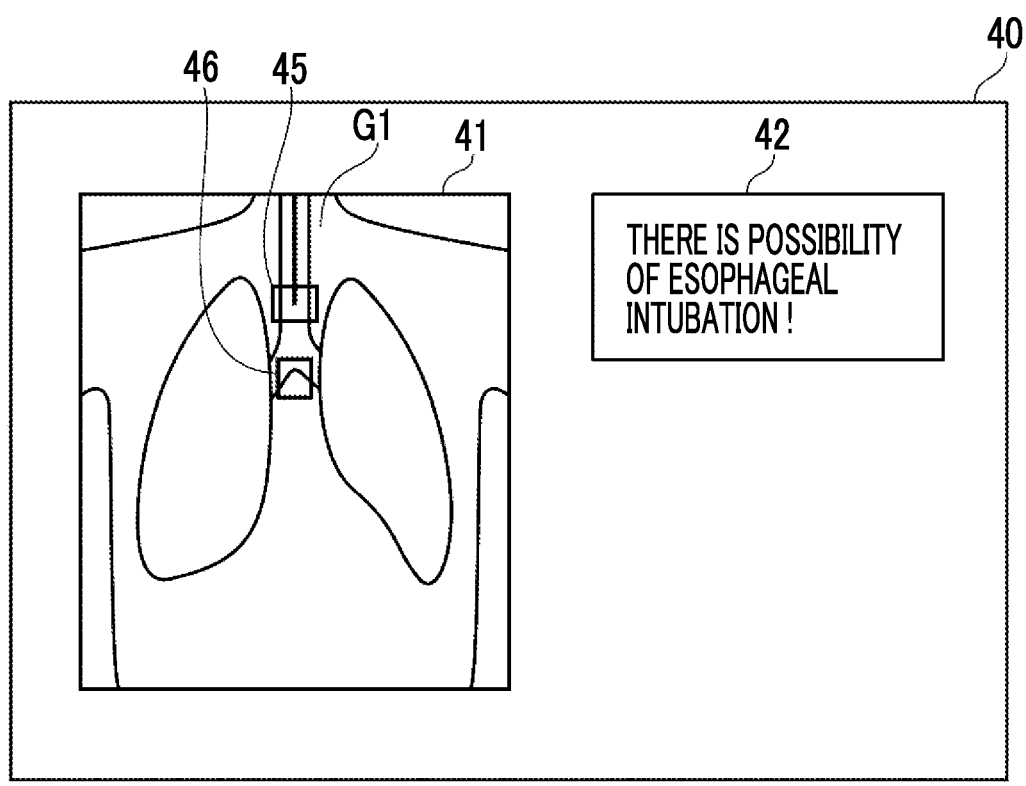
FIG. 10 is a diagram illustrating a radiographic image display screen.

FIG. 10 is a diagram illustrating a radiographic image display screen. As illustrated in FIG. 10, a display screen 40 includes an image display region 41 and a warning display region 42. The first radiographic image G1 is displayed in the image display region 41. In addition, the second radiographic image G2 may be displayed instead of the first radiographic image G1. A warning is displayed in the warning display region 42 in a case in which the determination unit 24 determines that the esophageal intubation has occurred. In FIG. 10, a warning with a text "There is a possibility of esophageal intubation!" is displayed. Further, in a case in which the determination unit 24 does not determine that the esophageal intubation has occurred, no warning is displayed or a text "There is no possibility of esophageal intubation" is displayed in the warning display region 42.

In addition, instead of the text, a warning may be issued by a color and/or a mark. For example, in a case in which the esophageal intubation has occurred, the color of the warning display region 42 may be red, or x may be displayed. On the other hand, in a case in which the esophageal intubation has not occurred, the color of the warning display region 42 may be blue, or ○ may be displayed. Further, a warning may be issued by voice.

Furthermore, rectangular marks 45 and 46 are given to the distal end 8A of the tracheal tube 8 and the bronchial bifurcation position in the displayed first radiographic image G1, respectively. The marks 45 and 46 are not limited to rectangles, and any shape, such as an arrow, can be used. Therefore, since the distal end 8A of the tracheal tube 8 and the bronchial bifurcation position are displayed so as to be distinguished from other regions, it is possible to easily check the distal end 8A of the tracheal tube 8 and the bronchial bifurcation position.

Next, a process performed in this embodiment will be described. FIG. 11 is a flowchart illustrating the process performed in this embodiment. First, the image acquisition unit 21 acquires the first and second radiographic images G1 and G2 (radiographic image acquisition: Step ST1), and the first derivation unit 22 derives the three-dimensional position of the distal end 8A of the tracheal tube 8 in the subject H on the basis of the position of the distal end 8A of the tracheal tube 8 in each of the first radiographic image G1 and the second radiographic image G2 (tracheal tube distal end position derivation: Step ST2).

Then, the second derivation unit 23 derives the three-dimensional position of the bronchial bifurcation in the subject H on the basis of the bronchial bifurcation position in each of the first radiographic image G1 and the second radiographic image G2 (bronchial bifurcation position derivation: Step ST3). Then, the determination unit 24 determines the insertion of the tracheal tube 8 into the esophagus, that is, esophageal intubation on the basis of the position P0 indicating the three-dimensional position of the distal end 8A of the tracheal tube 8 and the position P5 indicating the three-dimensional position of the bronchial bifurcation (esophageal intubation determination: Step ST4).

Then, the display control unit 25 displays the first radiographic image G1 or the second radiographic image G2 and displays the distal end 8A of the tracheal tube 8 and the bronchial bifurcation position so as to be distinguished from other regions in the displayed first radiographic image G1 or second radiographic image G2 (radiographic image display: Step ST5). In addition, in a case in which it is determined that the esophageal intubation has occurred (Step ST6: YES), a warning is issued (Step ST7), and the process ends. Further, in a case in which it is determined that the esophageal intubation has not occurred (Step ST6: NO), the process ends.

As described above, in this embodiment, the esophageal intubation is determined on the basis of the three-dimensional position P0 of the distal end 8A of the tracheal tube 8 and the three-dimensional position P5 of the bronchial bifurcation. Therefore, it is possible to check the insertion of the tracheal tube 8 into the esophagus.

Further, a warning is issued in a case in which the esophageal intubation has occurred, which makes it possible to easily check the insertion of the tracheal tube 8 into the esophagus.

Further, the first radiographic image G1 or the second radiographic image G2 is displayed, and the distal end 8A of the tracheal tube 8 and the bronchial bifurcation position are displayed so as to be distinguished from other regions in the displayed first radiographic image G1 or second radiographic image G2. Therefore, it is possible to easily check the positional relationship between the distal end 8A of the tracheal tube 8 and the bronchial bifurcation position and thus to dispose the distal end 8A of the tracheal tube 8 at a desired position before the bronchial bifurcation position. Furthermore, the displayed first radiographic image G1 or second radiographic image G2 is not entirely highlighted by image processing. Therefore, the displayed first radiographic image G1 or second radiographic image G2 can be used to make a diagnosis for checking an abnormality in the chest.

In addition, in the above-described embodiment, the radiation source 4 is moved to change the direction in which the subject H is irradiated with radiation. However, the present disclosure is not limited thereto. Two radiographic images may be acquired using the imaging apparatus 1 having a plurality of radiation sources at different positions. In this case, for example, the imaging apparatus 1 may have the radiation sources 4 at least at the first radiation source position 51 and the second radiation source position S2 illustrated in FIG. 1.

In addition, in the above-described embodiment, the radiation is not particularly limited. For example, α-rays or γ-rays other than X-rays can be applied.

In the above-described embodiment, for example, the following various processors can be used as a hardware structure of processing units performing various processes, such as the image acquisition unit 21, the first derivation unit 22, the second derivation unit 23, the determination unit 24, and the display control unit 25. The various processors include, for example, a CPU which is a general-purpose processor executing software (program) to function as various processing units, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as the plurality of processing units. A representative example of this aspect is a client computer or a server computer. A second example of the configuration is an aspect in which a processor that implements the functions of the entire system including the plurality of processing units using one integrated circuit (IC) chip is used. A representative example of this aspect is a system-on-chip (SoC). As such, various processing units are configured by using one or more of the various processors as the hardware structure.

Furthermore, specifically, an electric circuit (circuitry) obtained by combining circuit elements, such as semiconductor elements, can be used as the hardware structure of the various processors.

What is claimed is:

1. A radiographic image processing device comprising:
at least one processor,
wherein the processor
acquires a first radiographic image and a second radiographic image obtained by irradiating a subject, into which a tracheal tube has been inserted, with radiation in different directions,
derives a three-dimensional position of a distal end of the tracheal tube in the subject on the basis of a position of the distal end of the tracheal tube in each of the first radiographic image and the second radiographic image,
derives a three-dimensional position of a bronchial bifurcation in the subject on the basis of a bronchial bifurcation position in each of the first radiographic image and the second radiographic image, and
determines insertion of the tracheal tube into an esophagus on the basis of the three-dimensional position of the distal end of the tracheal tube and the three-dimensional position of the bronchial bifurcation,
wherein the processor determines that the tracheal tube is inserted into the esophagus in response to the three-dimensional position of the distal end of the tracheal tube being located on a dorsal side of the subject at a distance of a predetermined threshold value or more from the three-dimensional position of the bronchial bifurcation, and
wherein the processor issues a warning in response to it being determined that the tracheal tube is inserted into the esophagus.

2. The radiographic image processing device according to claim 1,
wherein the processor displays the first radiographic image or the second radiographic image and displays the position of the distal end of the tracheal tube and the bronchial bifurcation position in the first radiographic image or the second radiographic image to be distinguished from other regions.

3. A radiographic image processing method comprising:
acquiring a first radiographic image and a second radiographic image obtained by irradiating a subject, into which a tracheal tube has been inserted, with radiation in different directions;
deriving a three-dimensional position of a distal end of the tracheal tube in the subject on the basis of a position of the distal end of the tracheal tube in each of the first radiographic image and the second radiographic image;
deriving a three-dimensional position of a bronchial bifurcation in the subject on the basis of a bronchial bifurcation position in each of the first radiographic image and the second radiographic image; and
determining insertion of the tracheal tube into an esophagus on the basis of the three-dimensional position of the distal end of the tracheal tube and the three-dimensional position of the bronchial bifurcation,
wherein the tracheal tube is determined to be inserted into the esophagus in response to the three-dimensional position of the distal end of the tracheal tube being located on a dorsal side of the subject at a distance of a predetermined threshold value or more from the three-dimensional position of the bronchial bifurcation, and
wherein the radiographic image processing method further comprises issuing a warning in response to it being determined that the tracheal tube is inserted into the esophagus.

4. A non-transitory computer-readable storage medium that stores a radiographic image processing program that causes a computer to execute:
a procedure of acquiring a first radiographic image and a second radiographic image obtained by irradiating a subject, into which a tracheal tube has been inserted, with radiation in different directions;
a procedure of deriving a three-dimensional position of a distal end of the tracheal tube in the subject on the basis of a position of the distal end of the tracheal tube in each of the first radiographic image and the second radiographic image;
a procedure of deriving a three-dimensional position of a bronchial bifurcation in the subject on the basis of a bronchial bifurcation position in each of the first radiographic image and the second radiographic image; and
a procedure of determining insertion of the tracheal tube into an esophagus on the basis of the three-dimensional position of the distal end of the tracheal tube and the three-dimensional position of the bronchial bifurcation,
wherein the tracheal tube is determined to be inserted into the esophagus in response to the three-dimensional position of the distal end of the tracheal tube being located on a dorsal side of the subject at a distance of a predetermined threshold value or more from the three-dimensional position of the bronchial bifurcation, and
wherein the radiographic image processing program further causes the computer to execute a procedure of issuing a warning in response to it being determined that the tracheal tube is inserted into the esophagus.

* * * * *